A. B. WERDHOFF.
TRANSMISSION SLIDING GEAR LOCK.
APPLICATION FILED AUG. 8, 1919.
1,360,338.
Patented Nov. 30, 1920.
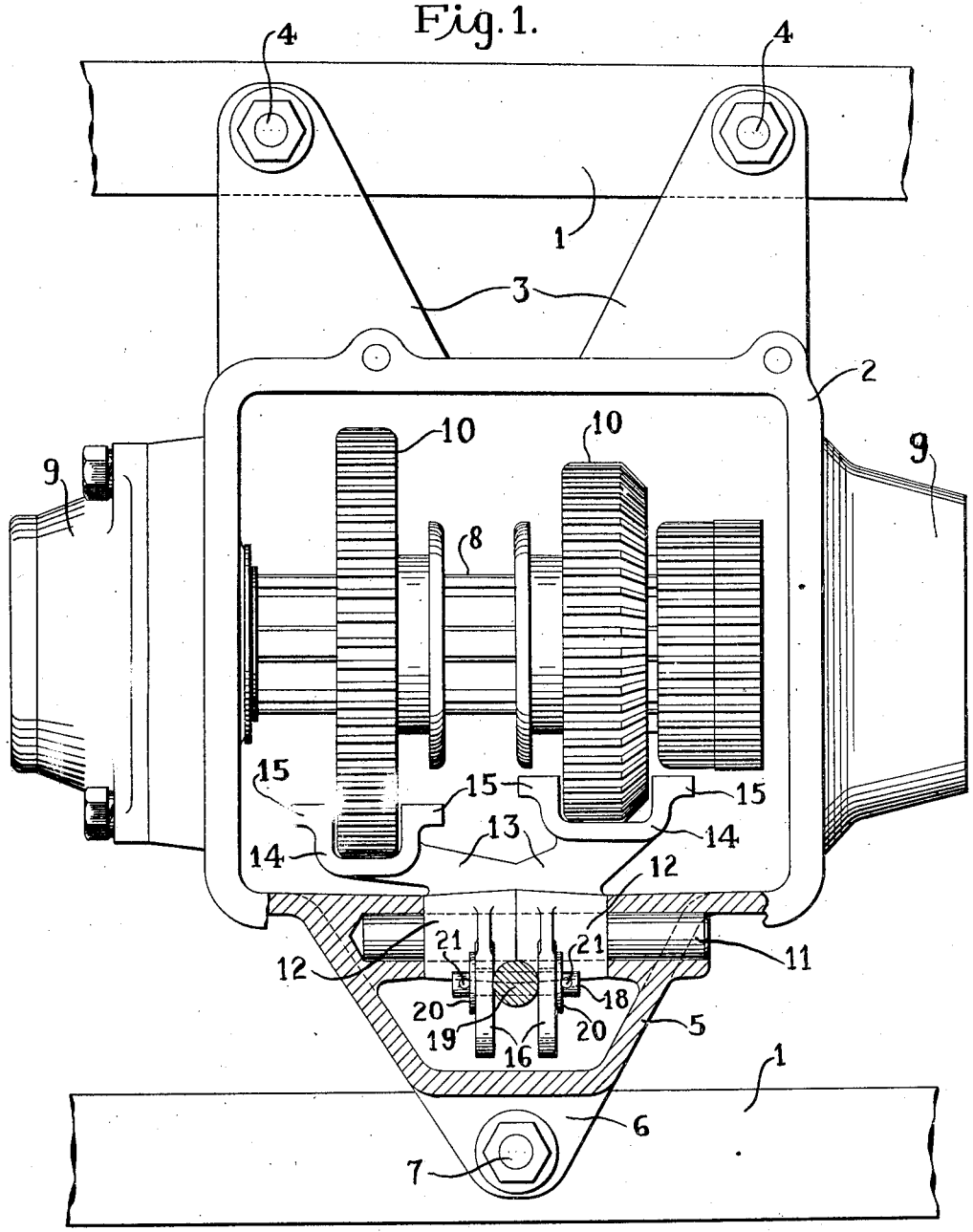

A. B. WERDHOFF.
TRANSMISSION SLIDING GEAR LOCK.
APPLICATION FILED AUG. 8, 1919.
1,360,338.
Patented Nov. 30, 1920.
2 SHEETS—SHEET 2.
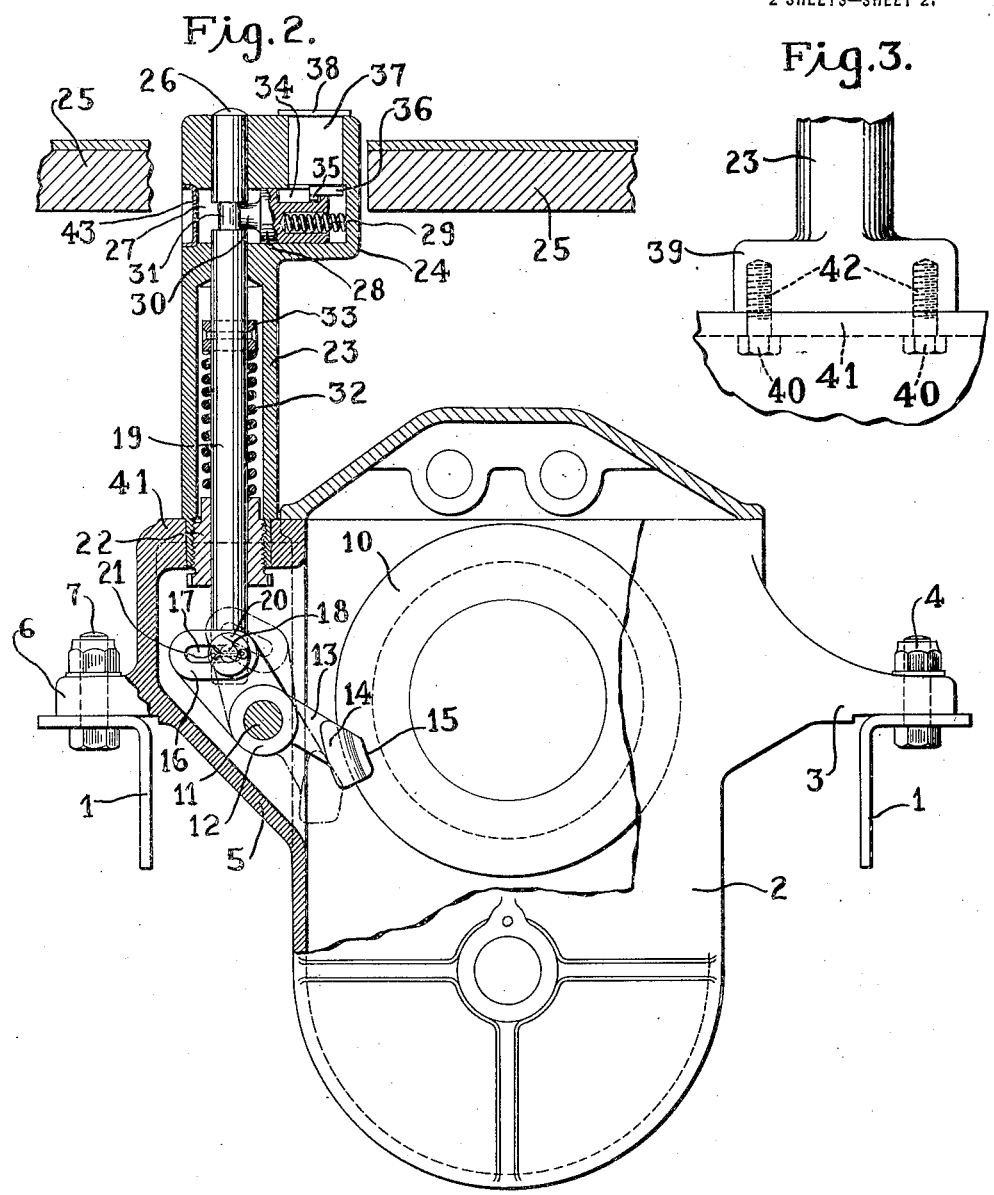
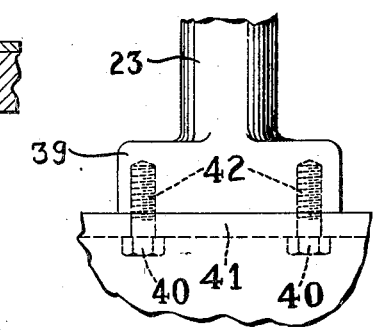

UNITED STATES PATENT OFFICE.

ALBERT B. WERDHOFF, OF DETROIT, MICHIGAN, ASSIGNOR TO THE STUDEBAKER CORPORATION, A CORPORATION OF NEW JERSEY.

TRANSMISSION-SLIDING-GEAR LOCK.

1,360,338.  Specification of Letters Patent.  Patented Nov. 30, 1920.

Application filed August 8, 1919. Serial No. 316,025.

*To all whom it may concern:*

Be it known that I, ALBERT B. WERDHOFF, a citizen of the United States of America, and resident of Detroit, in the county of Wayne and State of Michigan, have invented certain new and useful Improvements in Transmission-Sliding-Gear Locks, of which the following is a specification.

This invention relates to locking mechanism for gears and, particularly, relates to a mechanism for locking the transmission gears of an automobile, or similarly propelled vehicle, in neutral position.

Among the objects of my invention may be noted the following: to provide a mechanism for locking shiftable gearing in a neutral position, so that the same may not be accidentally or purposely jarred or shifted into driving gear; to provide means by which the transmission gear of an automobile may be locked in neutral position, but cannot be locked until the neutral position is actually gained; to provide means by which, after the transmission gear of an automobile has been established in neutral position, it may be locked, thus preventing the shifting of the gear, so as to propel the vehicle; to provide a locking means for the transmission gear of an automobile or similar vehicle, or, in fact, for any transmission gear, to prevent the same from being shifted into driving position or to power transmitting condition; to provide a means for locking transmission gear in neutral position, entirely under the control of the operator, and capable of being controlled by a key or similar instrument in the possession of the operator; to provide a means by which transmission gear may be locked at will, coupled with a controlling means which automatically coöperates with the locking means to hold the transmission gear locked in neutral position; to provide means by which the housing containing the locking means for the transmission gear may be secured to the casing so that it is not accessible to one unacquainted with the mode of securing the same; to provide means, which are practically inaccessible, for securing the housing of the gear locking mechanism to the gear casing; to provide means for supporting the transmission mechanism of an automobile or similar vehicle upon the chassis through the medium of the gear casing; and to provide a simple, durable, compact and economical structure capable of securing the objects set forth in the foregoing, so arranged that the casing inclosing the same may be supported in convenient position for manipulation and upon the opposite parallel bars of the chassis or similar supporting means.

In order that my invention may be clearly understood, I have provided drawings wherein:

Figure 1 is a top plan view of the transmission gear casing of an automobile, the cover or top member of the casing being removed and the casing-extension, carrying the locking mechanism and the plunger of the latter, being shown in section;

Fig. 2 is a sectional elevation of the transmission gear casing, part being broken away, and locking mechanism for the gear, this view also showing the floor of the automobile or similar vehicle through which the locking mechanism is actuated; and Fig. 3 is a detail view showing an elevation of the means by which the housing for the locking mechanism is secured to the gear casing.

Primarily, it should be understood that while, for example, I have shown in the drawings the locking mechanism applied to the transmission gear of an automobile or similar vehicle, my invention is not limited to this mode of application. In its broad features, my locking mechanism may be applied to any transmission gear, members of which are shiftable to neutral position, for locking the latter in that position so as to prevent the power mechanism or driving mechanism from being actuated.

Referring to the drawings, disclosing a mode of applying my locking mechanism, the numeral 1 indicates a pair of supporting members, or a supporting means, in this instance being the longitudinal or side bars of an automobile chassis. The transmission gear casing is indicated at 2, and is shown as provided on one side with a pair of lateral extensions 3, bolted, as at 4, to one bar of the chassis, and, on its opposite side, having a casing-extension 5, in turn having a bolt-receiving extension 6 adapted to rest upon the opposite bar of the chassis and be bolted thereto, as at 7. The splined driving-shaft 8, of usual form, is mounted to rotate in opposite bearings 9 of the casing 2, and has the usual shiftable transmission gears 10 mounted thereon so as to rotate therewith and slide relatively thereto, the latter movement being imparted by means not shown, since the same forms no part of my invention. It is sufficient that it be understood that the gears 10 are shiftable to neutral position, shown in Fig. 1, through the medium of a mechanism found suitable for the purpose. In this position, the said gears 10 are locked in accordance with my invention, and by the means clearly illustrated in Figs. 1 and 2.

The locking means consists of a journal-pin, or short rotary shaft, 11 mounted in bearings of the casing-extension 5, said shaft having mounted thereon the hub 12 of a pair of locking levers. Said hub 12 may be either loosely journaled on the member 11, if it be a pin, or it may be secured in any suitable way to the member 11, if it be a shaft journaled in the frame-extension 5. The hub 12 has two arms 13 extending into the gear casing 2, which arms are formed at their free ends with a yoke or bifurcation 14 adapted to embrace a gear 10. They are hereafter referred to as a "pair of yoke levers." Each yoke or bifurcated end has its arms enlarged or extended, as at 15, so as to provide a wide ledge for contact with its coöperating gear to prevent the bifurcated end of the lever from embracing the gear, unless or until, it has been shifted completely over to neutral position. The hubs 12 are also each provided with a slotted arm 16 extending therefrom at an angle to the arm 13 and adapted to receive in its slot 17, Fig. 2, a pin 18 extending through a plunger 19 and projecting a considerable distance beyond the opposite sides of said plunger, see Fig. 1. The pin 18 also passes through washers 20 at the outside of the arms 16, and each pin-extension has a holding pin 21 passed therethrough, so as to prevent the pin from sliding or jarring out of the plunger 19, and also so as to hold the parts compactly together to prevent rattling and wear. The plunger 19 extends through a bushing 22 screwed into the lower end of the housing 23, which, at its lower end, is set in the top of the casing-extension 5. The housing, at its upper end, is enlarged, as at 24, and extends through the flooring 25 of the car in position convenient for manipulation of the plunger 19 by the foot of the operator, said plunger passing through the enlargement 24 of the housing and having its upper end rounded, as at 26. The portion 24 of the housing is provided with a chamber 27, in which freely slides a locking member or bolt 28, bored longitudinally for the reception of an expansion spring 29, and provided with a reduced end 30 adapted to enter a circumferential groove 31 in the plunger. The spring 29 normally forces the bolt 28 into engagement with the plunger; but, a spring 32 surrounding the plunger within the housing 23 normally tends to hold the plunger elevated with its end 26 projecting considerably above the enlargement 24, and its groove 31 out of the range of the reduced end 30 of the bolt 28. The spring 32, at its upper end, engages the collar 33 adjustably secured to the plunger 19, and, at its lower end, engages the upper end of the bushing 22. By adjusting the collar 33 upon the plunger, the tension of the spring may be regulated. The bolt 28 is provided with an elongated slot 34 in which operates a lug 35 carried at the lower end of a barrel 36 mounted to rotate in the casing 37 of any suitable form of lock, such, for example, as a pin lock. The escutcheon 38 of the casing 37 overlaps the top of the enlargement 24 of the housing 23, and thus supports the casing 37 in said enlargement with the lug 35 normally projecting into the slot 34 of the bolt. A key, inserted in the escutcheon 38, will turn the barrel 36 so that the lug 35 may retract the reduced end 30 of the bolt 28 against the spring pressure 29, thus releasing the plunger 19, so that its spring 32 may drive the same upwardly to cause its end 26 to project the proper distance above the enlargement 24, limited by the position of the collar 33 within the housing 23. Thus the parts are ready for operation, and it will be understood that normally the yokes 14 are retracted to the dotted line position shown in Fig. 2.

In order that the locking mechanism for the transmission gear may not readily be tampered with, taken off, or displaced, the base of the housing 23, as shown in Fig. 3, is enlarged, as at 39, to provide sockets for a pair of screw-bolts 40, the same passing through the upper web 41 of the casing-extension 5, and into the threaded sockets 42 of the base 39. By this means the heads of the bolts 40 are within the casing-extension 5 and cannot be reached except by one familiar with the mechanism. They are, therefore, so to speak, inaccessible, and the housing is thus firmly held on the casing-extension 5, as clearly shown in Figs. 2 and 3. For oiling or other purposes, the enlargement 24 of the housing may be provided with a closure 43 at the entrance to the chamber 27 in which the bolt operates and through which the plunger 19 reciprocates.

Having thus described the details of my invention, the following mode of operation will be readily understood; Fig. 1 shows the transmission gearing 10 in neutral position and so held by the yoke-levers, and Fig. 2 shows the same position of the parts in full lines, with the plunger 19 depressed and held locked by the bolt 28, the latter having automatically forced its reduced end 30 into the groove 31 of the plunger. In this position of the parts, the transmission gear is held positively in neutral position, and, if the said gears be a part of the transmission of an automobile, the latter cannot be driven. Thus, the car is comparatively safe from theft. Fig. 2 shows the yoke-levers in a dotted line position, this being the inoperative position of the levers, viz., out of engagement with the transmission gears 10, which latter may now be shifted into engagement with the driving-gear of the car, so as to drive the latter. The plunger, in this position of the parts, is released by inserting the key at 38, turning the barrel 36 therewith, and thus causing the lug 35 to retract the bolt 28 from the groove 31 of the plunger 19, and enabling the spring 32 to force the bolt upwardly so that its pin 18, operating in the slots 17 of the yoke-levers, will rock the latter on the journals at 11 so as to release the transmission gearing. When it is desired to lock the transmission gearing in neutral position, the gears 10 are shifted in the usual manner to neutral position, and then the operator places his foot upon the end 26 of the plunger 19 to depress the latter and compress the spring 32. This operation rocks the yoke-levers upon their bearings and throws the yokes 14 into coöperative relation with the gears 10 to hold the same in neutral position. It sometimes happens, however, that the gears 10 are not shifted completely to neutral position, in which event the locking mechanism would not be effective. To avoid this undesirable condition, the yokes 14 have their arms 15 enlarged or extended laterally, so that, if the gears 10 are not shifted fully to neutral position, the yokes 14 cannot embrace the gears; but, the extensions, one side or the other, will strike the peripheries of the gears, which will prevent the locking mechanism from going fully into operative position, and at the same time will give notice to the operator that the gears have not been fully shifted to neutral position. The operator will then manipulate his lever again and shift the gears fully to neutral position, whereupon the plunger 19 can be fully depressed by the foot of the operator and the yokes thus caused to embrace the gears 10, as shown in Figs. 1 and 2. The plunger will then be automatically locked depressed by the bolt 28.

From the foregoing it will be seen that I have not only provided a means for locking the transmission gears in neutral position; but, I have also provided a means for determining whether the transmission gears have been actually shifted to neutral position.

My mechanism constitutes a safeguard against theft of an automobile. In other relations, it constitutes a means by which power transmitting gear may be prevented from operating when desired. The mode of securing the housing to the casing-extension 5 is such as to prevent anyone unacquainted with the mechanism from tampering with the same and putting it out of commission, or removing it from the casing so as to render the lock ineffective.

Having thus described my invention, what I claim and desire to secure by Letters Patent is:

1. In combination with the floor of an automobile, its transmission gear, the casing therefor, located below the floor and having a lateral extension, of a locking mechanism for the transmission gear extending from the floor to the casing, comprising a housing containing the actuating means, a locking lever journaled in the casing extension and having a gear-embracing part reaching into the casing, and a connection between the actuating means and the locking lever located within the casing extension.

2. In combination with the floor of an automobile, its chassis, and its transmission gear, of a casing for the gear having a lateral extension; means projecting from the casing and extension for securing the former upon the chassis; and a locking mechanism for the gear comprising a housing secured to the extension and projecting through the floor, actuating means within the housing having a member projecting through the floor and into the extension, and a locking lever for the gear within the extension and coöperating with the actuating means and reaching into the casing.

3. In combination with the floor of an automobile, its chassis and its transmission gear, of a casing for the gear having an opening at one side adjacent the transmission gear; a lateral extension formed on the casing at said opening; a housing mounted upon the extension having a lateral enlargement at its upper end extending through the floor; and a locking mechanism for the transmission gear having a plunger in the housing, a locking lever in the extension of the casing reaching through said opening, actuating connections in the extension, and an automatic lock for the plunger arranged in said lateral enlargement.

4. In combination with the chassis of an automobile, a transmission gear casing having at one side a lateral extension; means securing the casing to the chassis; transmission gear within the casing; a housing mounted on the said lateral extension; gear-locking means in said lateral extension reaching into the casing and coöperating with the transmission gear; actuating means in the housing terminating in the said extension and projecting through the floor of the automobile; and an automatic lock for the actuating means in a part of the housing extended through the floor.

5. In combination with the chassis of an automobile, a transmission gear casing having at one side a lateral extension; means securing the casing to the chassis; transmission gear within the casing; a housing mounted on the lateral extension; a gear-locking means in the extension comprising a yoke lever reaching into the casing and adapted to embrace the gear, the arms of which are laterally extended to engage the gear except in neutral position; actuating means for the gear-locking means; and an automatic lock for the said actuating means.

Signed by me at Detroit, Michigan, this 31st day of July, 1919.

ALBERT B. WERDHOFF.

Witnesses:
   VINCENT LINK,
   GEO. R. DAVENPORT.